US009608804B2

(12) United States Patent
Chen et al.

(10) Patent No.: US 9,608,804 B2
(45) Date of Patent: Mar. 28, 2017

(54) SECURE KEY AUTHENTICATION AND LADDER SYSTEM

(71) Applicant: Avago Technologies General IP (Singapore) Pte. Ltd., Singapore (SG)

(72) Inventors: Sherman (Xuemin) Chen, San Diego, CA (US); Steve Rodgers, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/918,612

(22) Filed: Jun. 14, 2013

(65) Prior Publication Data
US 2013/0279691 A1 Oct. 24, 2013

Related U.S. Application Data

(63) Continuation of application No. 10/769,173, filed on Jan. 30, 2004, now abandoned.

(51) Int. Cl.
*G06F 21/00* (2013.01)
*H04L 9/08* (2006.01)
(Continued)

(52) U.S. Cl.
CPC .......... *H04L 9/0816* (2013.01); *H04L 9/0822* (2013.01); *H04L 9/0825* (2013.01);
(Continued)

(58) Field of Classification Search
CPC ............. H04N 7/1675; H04N 21/4623; H04N 21/26606; H04N 21/4181; H04N 21/6334;
(Continued)

(56) References Cited

U.S. PATENT DOCUMENTS 5,309,516 A 5/1994 Takaragi et al.
5,920,626 A 7/1999 Durden et al.
(Continued)

FOREIGN PATENT DOCUMENTS

CN 1254473 5/2000
CN 1471773 1/2004
(Continued)

OTHER PUBLICATIONS

European Search Report for European Application No. 05000718.6, mailed May 4, 2005.
(Continued)

*Primary Examiner* — Yogesh Paliwal
(74) *Attorney, Agent, or Firm* — Sterne, Kessler, Goldstein & Fox P.L.L.C.

(57) ABSTRACT

Method and system for secure key authentication and key ladder are provided herein. Aspects of the method for secure key authentication may include generating a digital signature of a secure key in order to obtain a digitally signed secure key and transmitting the digitally signed secure key from a first location to a second location. The digital signature may be generated by utilizing an asymmetric encryption algorithm and/or a symmetric encryption algorithm. The digitally signed secure key may be encrypted prior to transmission. The secure key may be a master key, a work key and/or a scrambling key. The digitally signed secure key may be received at the second location and the digitally signed secure key may be decrypted to obtain a decrypted digitally signed secure key.

20 Claims, 7 Drawing Sheets

(51) Int. Cl.
*H04L 9/32* (2006.01)
*H04N 7/16* (2011.01)
*H04N 7/167* (2011.01)
*H04N 21/266* (2011.01)
*H04N 21/418* (2011.01)
*H04N 21/6334* (2011.01)

(52) U.S. Cl.
CPC .......... *H04L 9/0844* (2013.01); *H04L 9/3247* (2013.01); *H04N 7/163* (2013.01); *H04N 7/1675* (2013.01); *H04N 21/26606* (2013.01); *H04N 21/4181* (2013.01); *H04N 21/63345* (2013.01)

(58) Field of Classification Search
CPC  H04N 21/63345; H04N 7/163; H04L 9/0816; H04L 9/0822; H04L 9/0825; H04L 9/0844; H04L 9/3247
USPC .......................................................... 380/44
See application file for complete search history.

(56) References Cited

U.S. PATENT DOCUMENTS

| | | | |
|---|---|---|---|
| 6,005,938 | A | 12/1999 | Banker et al. |
| 6,035,038 | A | 3/2000 | Campinos et al. |
| 6,073,237 | A * | 6/2000 | Ellison ................ 713/171 |
| 6,144,743 | A | 11/2000 | Yamada et al. |
| 6,215,878 | B1 | 4/2001 | Harkins |
| 6,304,659 | B1 | 10/2001 | Gold et al. |
| 6,512,829 | B1 | 1/2003 | Nishioka et al. |
| 6,697,489 | B1 | 2/2004 | Candelore |
| 6,714,649 | B1 | 3/2004 | Masuda et al. |
| 6,931,532 | B1 | 8/2005 | Davis et al. |
| 7,024,553 | B1 | 4/2006 | Morimoto |
| 7,127,069 | B2 | 10/2006 | Nguyen |
| 7,143,438 | B1 | 11/2006 | Coss et al. |
| 7,257,616 | B2 | 8/2007 | Bass et al. |
| 7,296,147 | B2 | 11/2007 | Matsuzaki et al. |
| 7,317,798 | B2 | 1/2008 | Saito |
| 7,493,661 | B2 | 2/2009 | Liu et al. |
| 9,094,699 | B2 | 7/2015 | Chen et al. |
| 2002/0001386 | A1* | 1/2002 | Akiyama .............. 380/201 |
| 2002/0094089 | A1 | 7/2002 | Kamiya et al. |
| 2002/0126843 | A1 | 9/2002 | Murase et al. |
| 2002/0126847 | A1 | 9/2002 | Wajs et al. |
| 2002/0174366 | A1 | 11/2002 | Peterka et al. |
| 2002/0184512 | A1* | 12/2002 | Cardoso, Jr. ................ 713/193 |
| 2003/0037235 | A1 | 2/2003 | Aziz et al. |
| 2003/0061405 | A1 | 3/2003 | Fisher et al. |
| 2003/0108199 | A1 | 6/2003 | Pinder et al. |
| 2003/0221100 | A1 | 11/2003 | Russ et al. |
| 2004/0054792 | A1 | 3/2004 | Pitsos |
| 2004/0076120 | A1 | 4/2004 | Ishidoshiro |
| 2004/0177369 | A1 | 9/2004 | Akins, III |
| 2004/0237100 | A1 | 11/2004 | Pinder et al. |
| 2004/0243803 | A1 | 12/2004 | Codet et al. |
| 2005/0066355 | A1 | 3/2005 | Cromer et al. |
| 2005/0076138 | A1 | 4/2005 | Sterne |
| 2005/0084106 | A1 | 4/2005 | Venema et al. |
| 2005/0123135 | A1 | 6/2005 | Hunt et al. |
| 2005/0172132 | A1 | 8/2005 | Chen et al. |
| 2005/0177741 | A1 | 8/2005 | Chen et al. |
| 2008/0086641 | A1 | 4/2008 | Rodgers et al. |
| 2011/0197069 | A9 | 8/2011 | Rodgers et al. |

FOREIGN PATENT DOCUMENTS

| | | |
|---|---|---|
| WO | WO-98/43426 A | 10/1998 |
| WO | WO-99/07150 A | 2/1999 |
| WO | WO-02/062054 | 8/2002 |
| WO | WO 03/039153 A2 | 5/2003 |

OTHER PUBLICATIONS

Asano, Tomoyuki., "A revocation scheme with minimal storage at receivers." Advances in Cryptology-Asiacrypt 2002. Springer Berlin Heidelberg, 2002. 433-450.
programmable read-only memory by Wikipedia; date: Feb. 16, 2005.
What is a PROM; Published by Webopedia. Computer Dictionary; Date: Feb 1, 2001.
English-language Abstract for Chinese Patent Publication No. CN 1254473, published May 24, 2000, 1 page.
English-language Abstract for Chinese Patent Publication No. CN 1471773, published Jan. 28, 2004, 1 page.
Chen, L et al., U.S. Patent Appl. No. 14/800,242, filed Jul. 15, 2015, entitled "System and Method for Security Key Transmission With Strong Pairing to Destination Client".

* cited by examiner

FIG. 2     (PRIOR ART)

SECURE KEY AUTHENTICATION AND LADDER SYSTEM

CROSS-REFERENCE TO RELATED APPLICATIONS/INCORPORATION BY REFERENCE

[Not Applicable]

FIELD OF THE INVENTION

Certain embodiments of the invention relate to conditional access and copy protection systems. More specifically, certain embodiments of the invention relate to a method and system for secure key authentication and key ladder.

BACKGROUND OF THE INVENTION

The implementation of fee-based video broadcasting requires a conventional conditional access (CA) system to prevent non-subscribers and unauthorized users from receiving signal broadcasts. A complete CA system usually includes three main functions: a scrambling/descrambling function, an entitlement control function, and an entitlement management function.

The scrambling/descrambling function is designed to make the program incomprehensible for unauthorized receivers. Scrambling can be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm usually utilizes a secret key, called a control word. Once the signal is received, the descrambling can be achieved by any receiver that holds the secret key, or the control word, used by the scrambling algorithm prior to transmission. Scrambling and descrambling operations, in general, do not cause any impairment on the quality of the signals. The commonly used algorithms for scrambling digital data in CA systems are symmetric key ciphers. The control word used by the scrambling algorithm is a secret parameter known only by the scrambler and the authorized descramblers. In order to preserve the integrity of the encryption process, the control word has to be changed frequently in order to avoid any exhaustive searches by an unauthorized user which is intended to discover the control word.

The rights and associated keys needed to descramble a program are called entitlements. The entitlement control function provides the conditions required to access a scrambled program together with the encrypted secret parameters enabling the signal descrambling process for the authorized receivers. This data is broadcasted as conditional access messages, called entitlement control messages (ECMs). The ECMs carry an encrypted form of the control words, or a means to recover the control words, together with access parameters, such as an identification of the service and of the conditions required for accessing this service. Upon receipt of an ECM, the receiver transmits the encrypted control word and the access characteristics to the security device, for example, a smart card. After it has been confirmed that a user is authorized to watch the specific program, the security device checks the origin and integrity of the control word and the access parameters before decrypting the control word and sending it to the descrambler.

The entitlement management function is associated with distributing the entitlements to the receivers. There are several kinds of entitlements matching the different means to "buy" a video program. These entitlements are also broadcasted as conditional access messages, called entitlement management messages (EMMs). The EMMs are used to convey entitlements or keys to users, or to invalidate or delete entitlements or keys. The entitlement control functions and the entitlement management functions require the use of secret keys and cryptographic algorithms. For example, most modern conditional access systems utilize a smart card to store secret keys and to run cryptographic algorithms safely.

Most CA systems scramble and/or randomize transmitted data bits so that unauthorized decoders cannot decode the transmitted data bits. Authorized decoders are delivered a key that initializes the circuit that inverts the data bit randomization. As used herein, the term scrambling may be associated with the pseudo-random inversion of data bits based on a key that is valid for a short period of time. In addition to scrambling, a key may also be transformed into an encrypted key in order to protect it from any unauthorized users. From a cryptographic point of view, this transformation of the key to an encrypted key is the only part of the system that protects the data from a highly motivated pirate or a hacker. As a result, the scrambling portions of the process alone, in the absence of an key encryption, can be easily defeated. A CA system is usually associated with a system that implements key encryption and distribution of the encrypted key. The general requirements that a CA system with scrambling and encryption functionality must meet for digital video delivery are as follows: protection against signal piracy, efficient scrambling, flexibility, variety of supported formats, and ease of implementation.

With regard to robust protection against signal piracy, it must be difficult for a third party to perform unauthorized reception. In addition, the scrambled signal content must not be understandable. Efficient scrambling of all kinds of signals, as in multimedia broadcasts for example, must be possible and quality must not deteriorate (perceptibly) when these signals are being restored (quality signal restoration). A CA system is also flexible as it can be exercised on an elementary stream-by-stream basis, including the ability to selectively scramble bit streams in a program, if it is desired. Further, various business formats, such as multi-channel services and billing schemes, may be supported with low operating costs, and a private encryption system may be used, for example, by each program provider that is part of the CA system. A CA system with scrambling and encryption functionality may be implemented in standard consumer instruments, which also ensures cost effective receivers.

With either a conditional access system or a copy protection system, private (secure) keys are nearly always used for scrambling and descrambling high-value content or for protecting highly sensitive transactions. In a CA system, the content scrambling key must be protected. To ensure proper functionality, the CA system should perform scrambling according to the properties of the data for transmission. In addition, the CA system should change the key regularly to maintain the security of the scrambling system, and transmit the key information to the receiver in a secure manner using a hierarchical encryption system. Thirdly, for the purpose of operating fee-based broadcasting service, reception should be controlled according to the details of each users subscription.

Such CA system can be achieved in various ways depending on types of services, required functions, and security.

FIG. 1 is a block diagram illustrating a conditional access system utilizing a conventional key ladder system. The configuration of the CA system 100 in FIG. 1 has been recommended by International Telecommunications Union-Radiocommunication Sector (ITU-R). Referring to FIG. 1, there is shown a block diagram of an exemplary conditional access system 100, which may include a scrambler 102, a descrambler 108, encryptors 104 and 106, decryptors 110 and 112, a switch 115, and a viewing enable/disable circuit 114. On the transmit side of the diagram, TX, the compressed audio/video signal 116 may be scrambled by the scrambler 102, utilizing a scrambling key Ks 118, in order to obtain a scrambled broadcast signal 128. Program attribute information 120 may be encrypted by the encryptor 104, utilizing a work key Kw 122, to obtain the entitlement control messages 130. Program subscription information 124 may be encrypted by the encryptor 106, utilizing a master key 126, to obtain the entitlement management messages 132.

During signal scrambling in the CA system 100, the scrambling key Ks 118 determines the scrambling pattern. It is common to change the scrambling key at fixed intervals of time, such as every few seconds, to maintain a secure system. The scrambling key 118 must, therefore, be continuously transmitted to the subscriber's receiver. This is achieved in the CA system 100 by encrypting the scrambling key 118 by the encryptor 104 and transmitting it within the entitlement control messages 130. The ECM 130 may also include the program attribute information 120. The program attribute information 120 may be utilized, for example, for determining whether a subscriber is entitled to view a program on the basis of his or her subscription. To prevent the ECM 130, which includes the scrambling key 118, from being understood by a third party, the ECM 130 is encrypted by the encryptor 104 before transmission, by utilizing the work key Kw 122. The work key 122 may be updated on a monthly or yearly basis. The work key 122 is sent to the receiver through the entitlement management messages 132, together with the subscription information 124. The subscription information 124 may also contain any subscription updates for the specific subscriber.

Besides broadcast wave, the EMM 132 may be transmitted out-of-band utilizing other media like the Internet, telephone lines, a signaling network, or a smart card. Prior to transmission, the EMM 132 is encrypted by a master key Km 126. A master key is unique to each receiver and its security must be commonly managed among different broadcast operators that use the same type of receiver. This can normally be accomplished by setting up an organization for uniform key management. For example, in the CA system 100 illustrated in FIG. 1, the content scrambling key 118 is protected by the work key 122, which is in turn protected by the master key 126. This key protection "chain" is, sometimes, referred to as a key ladder.

On the receive side of the diagram, RX, the same key ladder is utilized in order to decrypt the necessary secure keys and scrambled broadcast audio/video signals 128. The master key 126 may be utilized with the decryptor 112 in order to decrypt the EMM 132 and the work key 122. As a result, the work key 122 is obtained as one of the outputs from the decryptor 112. The decrypted work key 122 may then be utilized by the decryptor 110 in order to decrypt the ECM 130 and the scrambling key 118. As a result, the scrambling key 118 is obtained as one of the outputs from the decryptor 110. The decrypted scrambling key 118 may then be utilized by the descrambler 108 in order to descramble the scrambled broadcast signal 128 and obtain the compressed audio/video output 140.

Access to the compressed audio/video output 140 by a user is determined in accordance with the user's subscription information 124 and the program attribute information 120. The decryptor 112 decrypts the EMM 132 to obtain decrypted subscription information 125. The decryptor 110 decrypts the ECM 130 to obtain decrypted program attribute information 120. The viewing enable/disable module 114 receives the decrypted subscription information 125 and the decrypted program attribute information and may then determine whether or not a user is entitled to receive the compressed audio/video output 140. If the user is entitled to receive the compressed audio/video output 140 (for example, the user has a valid subscription for a given programming channel), then the viewing enable/disable module 114 issues a control signal 134 activating the switch 115. Once the switch 115 is activated, this allows for the decrypted scrambling key 118 to be entered into the descrambler 108, which in turn allows for the descrambling of the compressed audio/video output 140.

FIG. 2 is a block diagram illustrating secure key unwrapping in a conventional key ladder system. Referring to FIG. 2, the key ladder system 200 may comprise a one time programmable (OTP) memory 202, a secure key generating module 204 and a key unwrapping module 206. The key unwrapping module 206 may comprise scramblers 208, 210, 212 and 214. Each of the scramblers 208, 210, 212 and 214 may utilize a symmetric encryption algorithm, for example a Data Encryption Standard (DES), a 3DES or an Advanced Encryption Standard (AES) type of algorithm, in order to descramble an encrypted key input. The OTP memory 202 in the key ladder system 200 may be adapted to store a root key, for example a key such as the master key 126 in FIG. 1. The root key stored in the OTP memory 202 may be further protected by the secure key generating module 204. The secure key generating module 204 may comprise suitable logic, circuitry and/or code that may be adapted to scramble, or otherwise further enhance the security of the root key stored in the OTP memory 202.

The key unwrapping module 206 may be adapted to "unwrap", or descramble, various application keys, for example, application key 1, 228, and application key 2, 230. In order to achieve this, the key unwrapping module 206 may utilize several encrypted keys, for example, encrypted key 1, 216, encrypted key 2, 218, encrypted key 3, 220, and encrypted key 4, 222. Once the root key stored in the OTP memory 202 is scrambled by the secure key generating module 204, the scrambled root key 205 may be utilized by the scrambler 208 in order to decrypt the encrypted key 1, 216, and obtain a decrypted key 224. The decrypted key 224 may comprise, for example, a work key. The decrypted key 224 may be utilized by the scrambler 210 in order to decrypt encrypted key 2, 218, and obtain the decrypted key 226. The decrypted key 226 may comprise, for example, a scrambling key.

The decrypted key 226 may be utilized by the scrambler 212 in order to decrypt encrypted key 3, 220, and obtain the decrypted application key 1, 228. Similarly, the decrypted application key 228 may be utilized by the scrambler 214 in order to decrypt encrypted key 4, 222, and obtain the decrypted application key 2, 230. Decrypted application keys 228 and 230 may be further utilized for various functions, for example, for copy protection of broadcast signals. The key ladder in the key unwrapping module 206 may be adapted to have varying levels of protection by increasing the number of the encrypted keys and the corresponding scramblers, and by utilizing each previously decrypted application key in a subsequent decryption of a following encrypted key. The key ladder may be utilized to "unwrap" a master key, a work key and a scrambling key. The master key, work key and scrambling key may then be utilized to decrypt one or more application keys.

Even though the key unwrapping module 206 may provide increasing level of protection by increasing the number of scramblers and encrypted keys it may be difficult to determine whether or not the received encrypted keys in the key ladder system 200 of FIG. 2 have been manipulated by unauthorized parties.

When encrypted data is transmitted over an insecure channel, the transmitting and/or the receiving party may need the ability to monitor such communication and obtain verification of the identity of the other party, and of the integrity and origin of the encrypted data that was transmitted. Referring now to FIG. 3, there is illustrated a flow diagram of a method 300 for conventional digital signature generation and verification process utilizing public key encryption. A transmitting entity may create a signature on a message 301 prior to transmission of the message.

In general, a signature s of a message m may be computed, for example, by applying an algorithm represented by the relationship $s=S_A(m)$, where $S_A$ is a signing function for the message m. Prior to creating the signature, the outgoing message 301 may be compressed by a compression algorithm 303. The compression algorithm 303 may be, for example, a secure hash algorithm. A digital signature algorithm 307 may then be applied to the compressed message or message digest 305. The digital signature algorithm may utilize a private key 309 in order to generate the digital signature 311. After generating the signature s, the pair (s;m) may be transmitted. The digital signature 311 may then be transmitted together with the message digest 305.

A receiving entity may then receive the digital signature 311 and the message digest 305 in a form of a received message 313. The receiving entity may then apply the same decompression algorithm used by the transmitting entity on the message 301. For example, a secure hash algorithm 315 may be applied in order to decompress the received message 313 and obtain the message digest 317. In order for the receiving entity to verify that the digital signature 311 on the received message 313 was created by the transmitting entity and not by a third outside party, a verification algorithm 319 may be applied to the message digest 317.

In general, to verify that a signature s on a message m was created by a transmitting entity A, a receiving entity B, referenced to as a verifier, may obtain the verification function $V_A$ of A and may compute a result u from applying the verification function, where the result u may be represented by the relationship $u=V_A(m, s)$. The signature s may be authenticated as created by A if u=true, and the signature may be rejected as unauthorized if u=false.

Similarly, the verification algorithm 319 may utilize a public key 321 together with the message digest 317 in order to authenticate the digital signature 311. If the result of the verification operation 323 is true, the digital signature 311 is authenticated, and if the result 323 is false, the digital signature 311 may be rejected as unauthorized.

There are several properties that may be required of the signing and verification functions, 307 and 319, respectively. The digital signature 311 is a valid signature of the message digest 305 if and only if the verification function 319 returns a true result. In addition, the signing function 307 and the verification function 319 are selected so that it is computationally infeasible for any entity, other than the transmitting and the receiving entities, to find, for any incoming message digest, a digital signature such that the verification function returns a true result.

FIG. 4 is a block diagram illustrating a conventional secure system for signature verification utilizing public key encryption. The conventional secure system 400 may comprise a transmitting entity A 402 and a receiving entity B 404. Entity A 402 may "sign" the message m 414 by first applying an encryption algorithm 406 to the message m, yielding signature s 416. The encryption algorithm 406 may comprise an asymmetric encryption algorithm $E_{e_A}(s)$, such as a public key encryption algorithm, in order to encrypt, or sign, the message m. The transmitting entity A 402 may then encrypt the signature s 416 by applying an encryption algorithm 408 to the signature s, yielding encrypted signed message c 421. The encryption algorithm 408 may comprise a symmetric encryption algorithm of the receiving entity B, $E_{e_B}(s)$, in order to encrypt the signature s 416. The encrypted signed message c 421 may then be transmitted over an unsecured public channel 422, where it may be exposed to attacks by an attacker 424.

After the receiving entity B 404 receives the encrypted signed message c 421, a decryption algorithm 410 may be applied to the encrypted signed message c 421 to obtain the decrypted signature s 418. The decryption algorithm 410 may comprise a symmetric encryption algorithm of the receiving entity B, $D_{d_B}(c)$, in order to decrypt the encrypted signed message c 421 to obtain the decrypted signature s 418. The signature s 418 may then be further decrypted, or verified, by the decryption algorithm 412 to obtain the decrypted message m 420. The decryption algorithm 412 may comprise an asymmetric encryption algorithm $D_{d_A}(m)$, in order to verify the signature s 418 and obtain the decrypted and verified message m 420. If the resulting message m 420 is an intelligible message, it may be concluded that the message m 420 must have been initiated by the transmitting entity A 402, since no one else could have known A's secret decryption key $e_A$ to form the signature s 416.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for secure key authentication and key ladder. The method for secure key authentication may include generating a digital signature of a secure key in order to obtain a digitally signed secure key and transmitting the digitally signed secure key from a first location to a second location. The digital signature may be generated by utilizing an asymmetric encryption algorithm and/or a symmetric encryption algorithm. The digitally signed secure key may be encrypted prior to transmission. The secure key may be a master key, a work key and/or a scrambling key. The digitally signed secure key may be received at the second location and the digitally signed secure key may be decrypted to obtain a decrypted digitally signed secure key. If the secure key comprises a master key, a decrypted digitally signed master key may be utilized for decrypting an encrypted digitally signed work key. If the secure key comprises a work key, a decrypted digitally signed work key may be utilized for decrypting an encrypted digitally signed scrambling key. The authenticity of the digital signature of the digitally signed secure key may be verified by utilizing an asymmetric decryption algorithm and/or a symmetric decryption algorithm. The verification feature may be a user-selectable feature.

Another embodiment of the invention provides a machine-readable storage, having stored thereon a computer program having at least one code section for secure key authentication, the at least one code section executable by a machine for causing the machine to perform the steps as described above.

In another embodiment of the invention, a system for secure key authentication and key ladder may be provided. The system may include at least one processor for generating a digital signature of a secure key in order to obtain a digitally signed secure key; and transmitting the digitally signed secure key by the at least one processor from a first location to a second location. The digital signature may be generated by utilizing an asymmetric encryption algorithm and/or a symmetric encryption algorithm. The digitally signed secure key may be encrypted by the at least one processor prior to transmission. The secure key may be one of a master key, a work key and a scrambling key. The at least one processor may receive the digitally signed secure key at the second location and the digitally signed secure key may be decrypted by the at least one processor in order to obtain a decrypted digitally signed secure key. If the secure key comprises a master key, a decrypted digitally signed master key may be utilized for decrypting an encrypted digitally signed work key. If the secure key comprises a work key, a decrypted digitally signed work key may be utilized for decrypting an encrypted digitally signed scrambling key. The authenticity of the digital signature of the digitally signed secure key may be verified by utilizing an asymmetric decryption algorithm and/or a symmetric decryption algorithm. The at least one processor may determine whether to verify authenticity of the digital signature. The at least one processor may comprise one of a host processor, a microprocessor, and a microcontroller.

In yet another embodiment of the invention, a system for secure key authentication and key ladder may include a transmitter. The transmitter may comprise a generator that generates a digital signature of a secure key in order to obtain a digitally signed secure key, and the transmitter transmits the digitally signed secure key. The generator may generate the digital signature by utilizing an asymmetric encryption algorithm and/or a symmetric encryption algorithm. The digitally signed secure key may be encrypted by an encryptor prior to transmission, in order to obtain an encrypted digitally signed key. The secure key may be a master key, a work key and/or a scrambling key. The digitally signed secure key may be received by a receiver. The receiver may comprise a decryptor that decrypts the digitally signed secure key to obtain a decrypted digitally signed secure key. The decryptor may utilize a digitally signed, master key to decrypt an encrypted digitally signed work key. The decryptor may also utilize a digitally signed work key to decrypt an encrypted digitally scrambling key. The receiver may comprise a verifier that verifies the authenticity of the digital signature of the digitally signed secure key. The verifier may utilize an asymmetric decryption algorithm and/or a symmetric decryption algorithm. The verifier may determine whether to verify authenticity of the digital signature.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for secure key authentication and key ladder. The method for secure key authentication may include generating a digital signature of a secure key in order to obtain a digitally signed secure key; and transmitting the digitally signed secure key from a first location to a second location. The digital signature may be generated by utilizing an asymmetric encryption algorithm and/or a symmetric encryption algorithm. The digitally signed secure key may be encrypted prior to transmission. The secure key may be one of a master key, a work key and a scrambling key. The digitally signed secure key may be received at the second location and the digitally signed secure key may be decrypted to obtain a decrypted digitally signed secure key. If the secure key comprises a master key, a decrypted digitally signed master key may be utilized for decrypting an encrypted digitally signed work key. If the secure key comprises a work key, a decrypted digitally signed work key may be utilized for decrypting an encrypted digitally signed scrambling key. Some additional aspects of the invention may include verifying the authenticity of the digital signature of the digitally signed secure key. The authenticity of the digital signature may be verified by utilizing an asymmetric decryption algorithm and/or a symmetric decryption algorithm. The verification feature may be a user-selectable feature.

Figure 1:
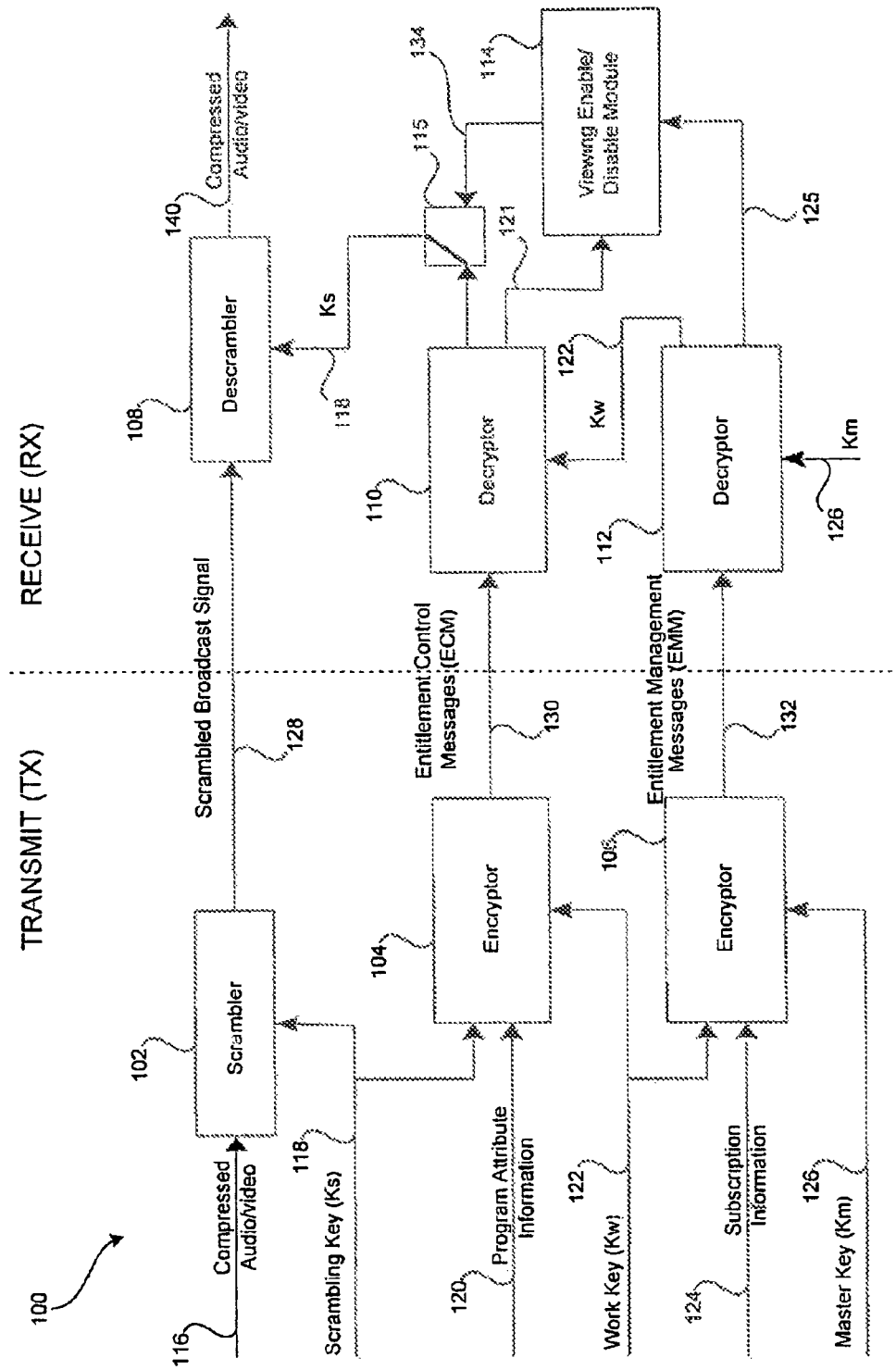
FIG. 1 is a block diagram illustrating conditional access system utilizing a conventional key ladder system.
Figure 2:
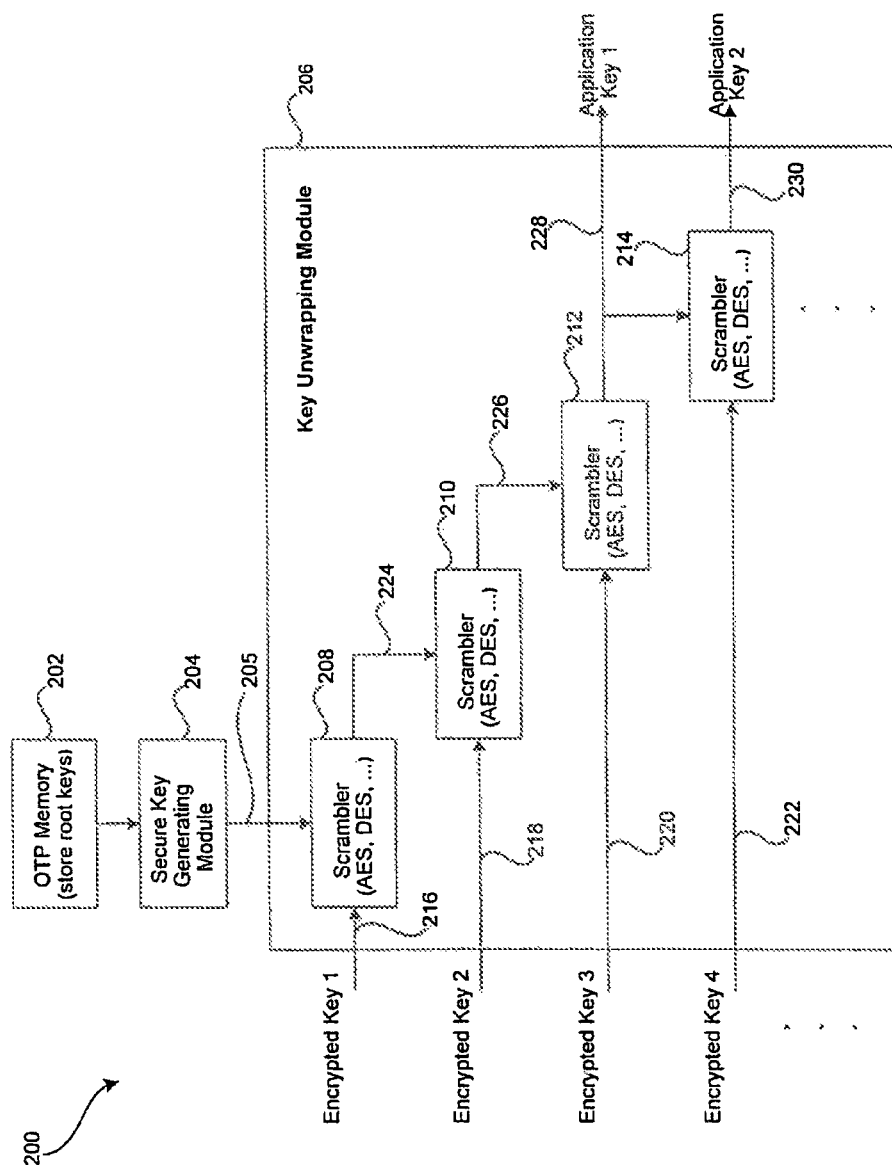
FIG. 2 is a block diagram illustrating secure key unwrapping in a conventional key ladder system.
Figure 3:
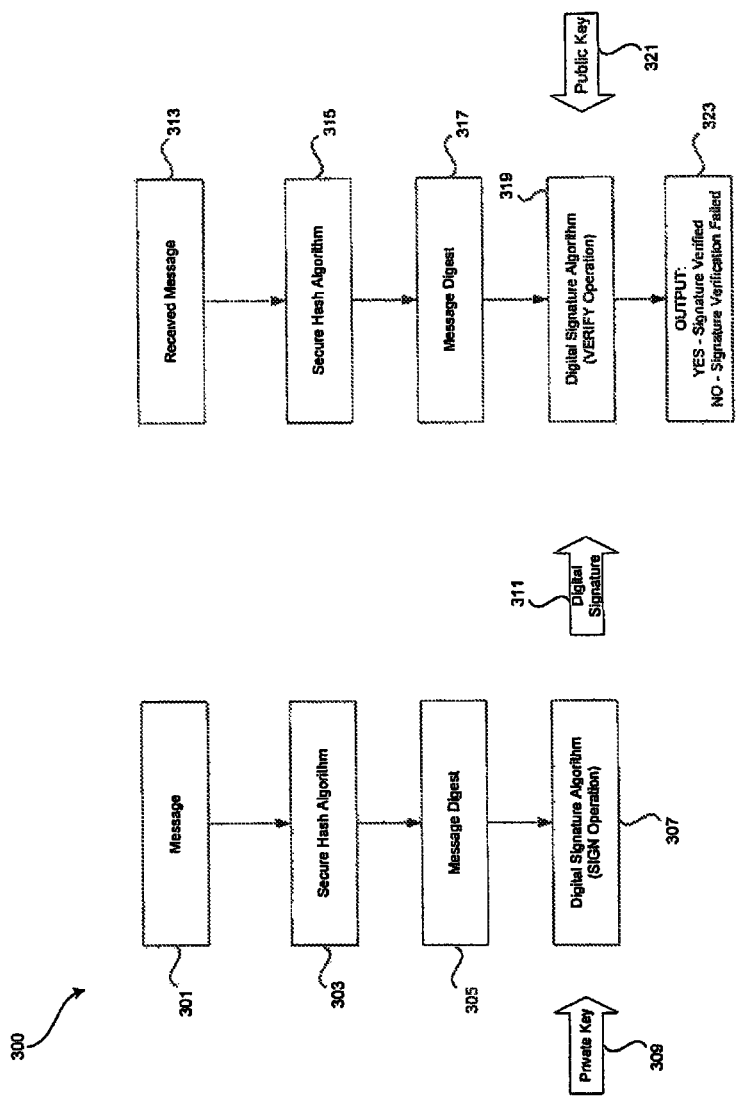
FIG. 3 is a flow diagram illustrating a method for conventional digital signature generation and verification process utilizing public key encryption.
Figure 4:
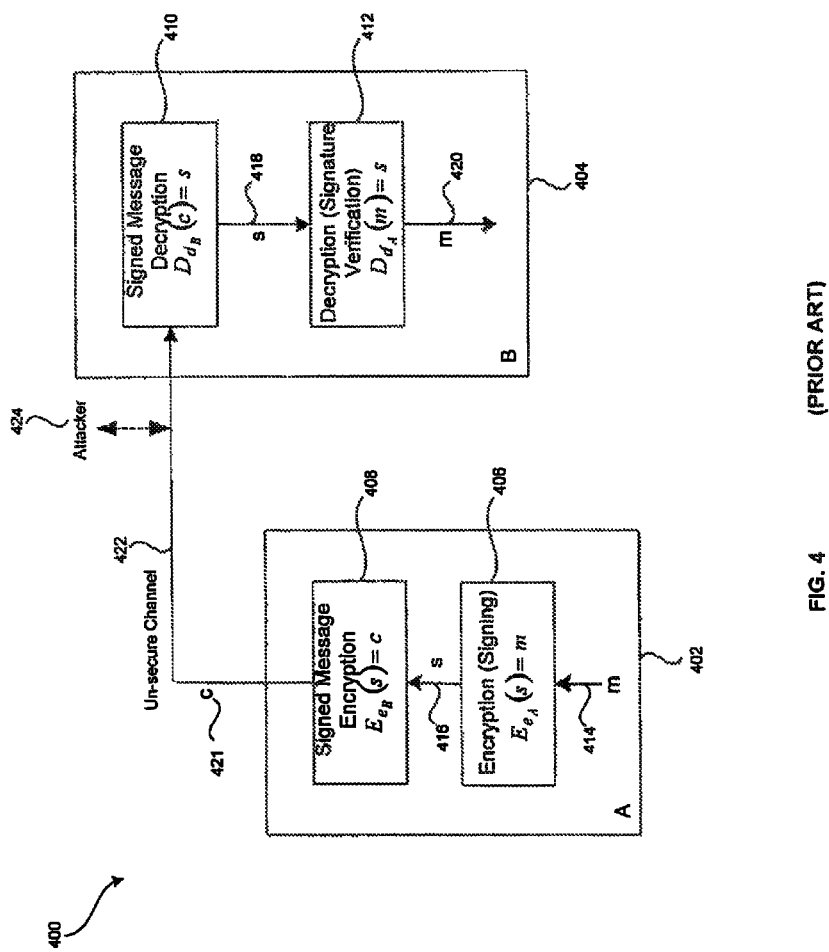
FIG. 4 is a block diagram illustrating conventional secure system for signature verification utilizing public key encryption.
Figure 5:
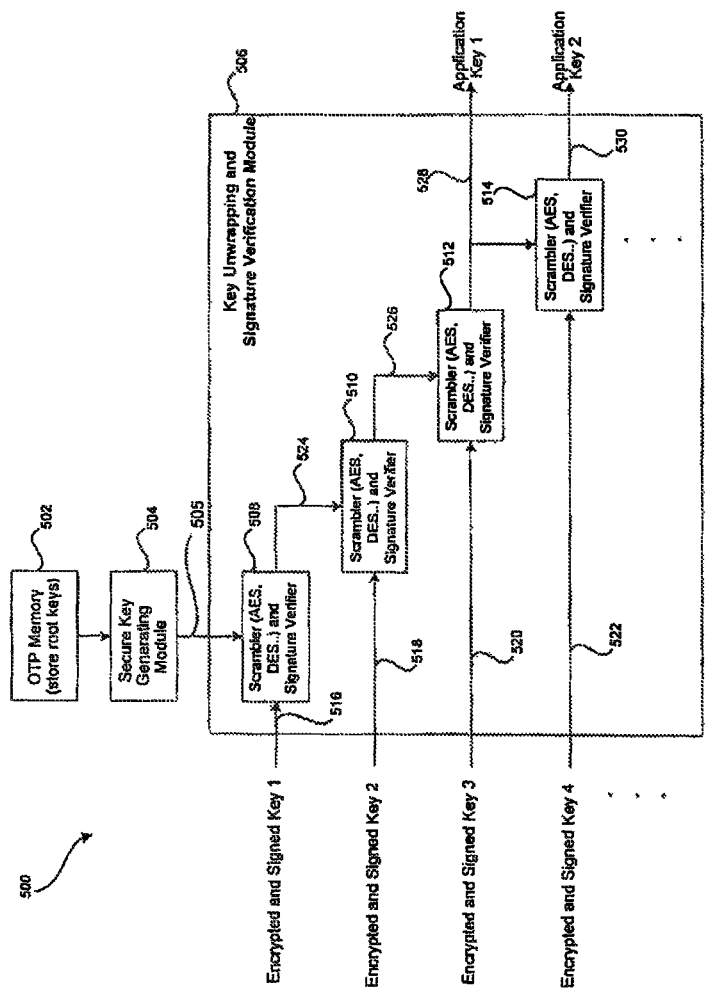
FIG. 5 is a block diagram illustrating secure key unwrapping and signature verification system, in accordance with an embodiment of the present invention.

FIG. 5 shows a block diagram illustrating a secure key unwrapping and signature verification system, in accordance with an embodiment of the present invention. Referring to FIG. 5, the key ladder system 500 may comprise a one time programmable (OTP) memory 502, a secure key generating module 504 and a key unwrapping and signature verification module 506. The key unwrapping and signature verification module 506 may be adapted to "unwrap", or descramble, various application keys, for example, application key 1, 528, and application key 2, 530. In order to achieve this, the key unwrapping and signature verification module 506 may utilize several encrypted and signed keys, for example, encrypted and signed key 1, 516, encrypted and signed key 2, 518, encrypted and signed key 3, 520, and encrypted and signed key 4, 522. In accordance with an aspect of the present invention, the encrypted and signed keys 516, 518, 520 and 522 may have been initially signed by a transmitting entity utilizing an asymmetric encryption algorithm, such as a public key algorithm, for example a Rivest-Shamir-Adleman (RSA), a Digital Signature Algorithm (DSA), or an Elliptic Curve Cryptography (ECC) type of algorithm. The signed keys may then have been encrypted utilizing a symmetric encryption algorithm, such as a DES, a 3DES, or an AES type of algorithm.

The key unwrapping and signature verification module 506 may comprise scrambler and signature verifiers 508, 510, 512 and 514. Each of the scrambler and signature verifiers 508, 510, 512 and 514 may comprise suitable logic, circuitry and/or code that may be adapted to utilize a symmetric encryption algorithm, for example a DES, a 3DES, or an AES type of algorithm, in order to descramble an encrypted signed key input. Each of the scrambler and signature verifiers 508, 510, 512 and 514 may also be adapted to utilize a public key algorithm, for example an RSA, a DSA, or an EC type of algorithm, in order to verify a decrypted signed key.

The OTP memory 502 in the key ladder system 500 may be adapted to store a root key, for example a master key. The root key stored in the OTP memory 502 may be further protected by the secure key generating module 504. The secure key generating module 504 may comprise suitable logic, circuitry and/or code that may be adapted to scramble, or otherwise further enhance the security of the root key stored in the OTP memory 502.

Once the root key stored in the OTP memory 502 is scrambled by the secure key generating module 504, the scrambled root key 505 may be utilized by the scrambler and signature verifier 508 in order to decrypt, and verify the signature of, the encrypted and signed key 1, 516. In this way, the generated decrypted key 524 is verified. The decrypted and verified key 524 may comprise, for example, a work key. The decrypted and verified key 524 may be utilized by the scrambler 510 in order to decrypt, and verify the signature of, encrypted and signed key 2, 518, and to obtain the decrypted and verified key 526. The decrypted and verified key 526 may comprise, for example, a scrambling key.

The decrypted and verified key 525 may be utilized by the scrambler 512 in order to decrypt, and verify the signature of, encrypted and signed key 3, 220, and to obtain the decrypted and verified application key 1, 528. Similarly, the decrypted and verified application key 528 may be utilized by the scrambler 514 in order to decrypt, and verify the signature of, encrypted and signed key 4, 522, and to obtain the decrypted and verified application key 2, 530. Decrypted and verified application keys 528 and 530 may be further utilized for various functions, for example, for copy protection of broadcast signals. In accordance with an aspect of the present invention, the key ladder in the key unwrapping and signature verification module 506 may be adapted to have varying levels of protection by increasing the number of the encrypted and signed keys and the corresponding scramblers, and by utilizing each previously decrypted and verified application key in a subsequent decryption of a following encrypted and signed key. The key ladder may be utilized to "unwrap" a signed and encrypted master key, a signed and encrypted work key and a signed and encrypted scrambling key. The master key, work key and scrambling key may then be utilized to decrypt one or more application keys.

Figure 6A:
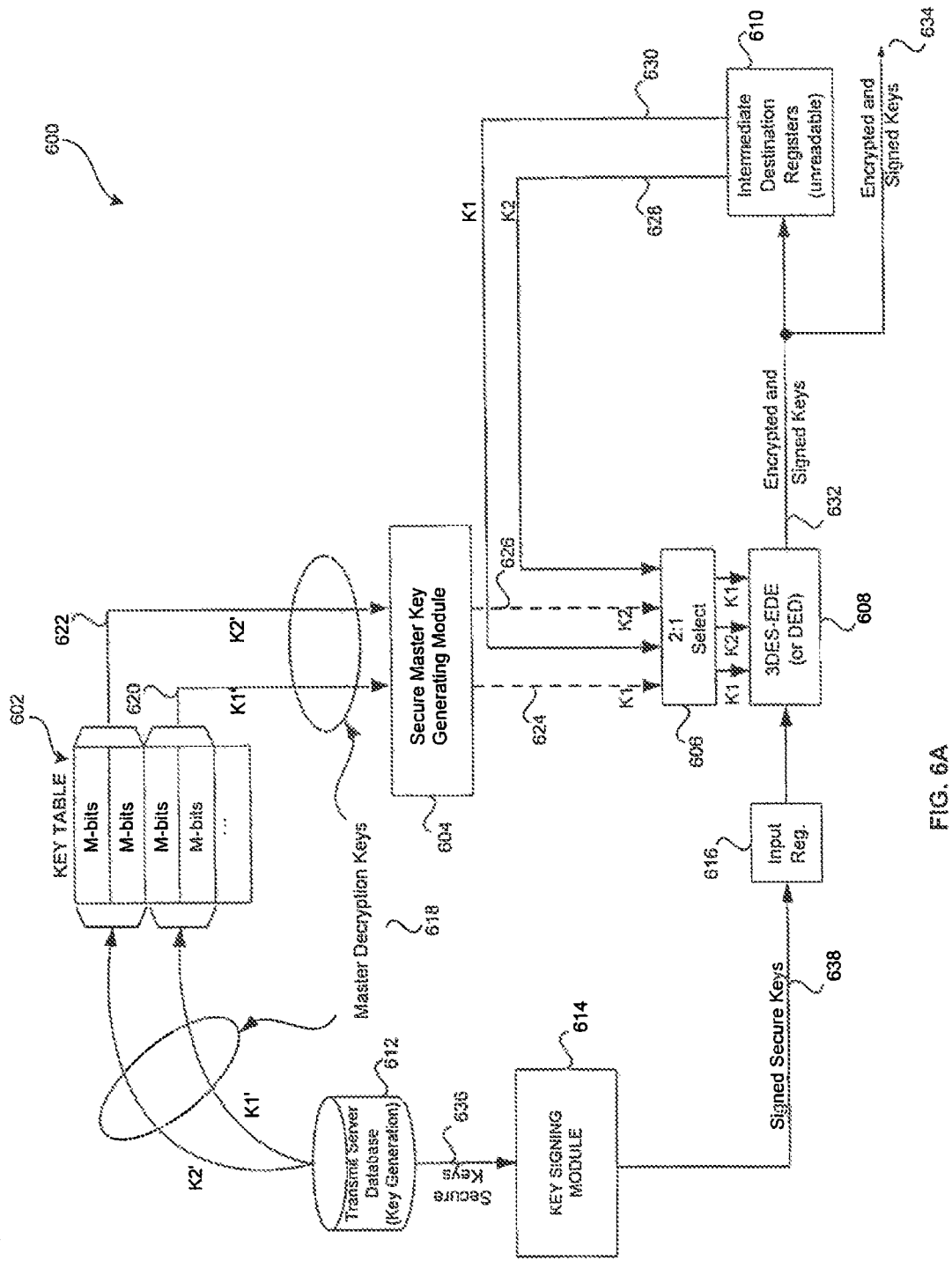
FIG. 6A is a block diagram of an exemplary system for secure key generation, secure key signing, and secure key encryption, in accordance with an embodiment of the present invention.

FIG. 6A illustrates a block diagram of an exemplary system for secure key generation, secure key signing and secure key encryption, in accordance with an embodiment of the present invention. Referring to FIG. 6A, the exemplary system 600 may comprise a key table 602, a transmit server database 612, a key signing module 614, an input register 616, a secure master key generating module 604, a selector 606, an encryptor 608, and intermediate destination registers 610.

The transmit server database 612 may comprise suitable logic, circuitry and/or code that may be adapted to generate a plurality of secure keys, for example, master decryption keys 618. Master decryption keys 618 may comprise a master key K1' 620 and master key K2' 622. In accordance with an aspect of the present invention, the master decryption keys 618 may be utilized in the encryption and decryption of one or more secure keys, for example, a work key and/or a scrambling key.

Once master decryption keys 618 are generated by the transmit server database 612, the master decryption keys 618 may be stored in a key table 602. Each of the master decryption keys 620 and 622 may comprise an even number of bits. For example, master decryption keys 620 and 622 may each occupy two M-bit cells in the key table 602. The key table 602 may be part of a random access memory (RAM), such as a DRAM or SRAM, for example. The key table 602 may also be adapted to store a plurality of master decryption keys.

Once the master decryption keys are stored in the key table 602, the master decryption keys 618 may be sent to the secure master key generating module 604. The secure master key generating module 604 may comprise suitable logic, circuitry and/or code that may be adapted to further enhance the security of master decryption keys K1' 620 and K2' 622. In accordance with an aspect of the present invention, the secure master key generating module 604 may comprise an encryptor or a scrambler. The secure master key generating module 604 may enhance the security of master decryption keys K1' 620 and K2' 622, and may generate a secure master decryption key K1 624 and a secure master decryption key K2 626.

The transmit server database 612 may also generate a plurality of secure keys 636, which may be communicated from the transmit server database 612 to the key signing module 614. The key signing module 614 may comprise suitable logic, circuitry and/or code that may be adapted to "sign" the secure keys 636 and generate signed secure keys 638. In accordance with an aspect of the present invention, the key signing module may utilize a symmetric encryption algorithm and/or an asymmetric encryption algorithm to generate the signed secure keys 638. The signed secure keys 616 may then be stored in an input register 616, prior to being communicated to the encryptor 608.

The selector 606 may comprise suitable logic, circuitry and/or code that may be adapted to select from one or more inputs and generate one or more outputs. In accordance with an aspect of the present invention, the selector 606 may be a 2:1 selector and may generate three outputs from any two received inputs. For example, the secure master decryption keys 624 and 626 may be utilized by the selector 606 as inputs to generate an output with the secure master decryption key 624 selected twice and the secure master decryption key 626 selected once.

The encryptor 608 may comprise suitable logic, circuitry and/or code that may be adapted to encrypt any of the signed secure keys 638. In accordance with an aspect of the present invention, the encryptor 608 may comprise a 3DES-Encrypt-Decrypt-Encrypt (EDE) or Decrypt-Encrypt-Decrypt (DED) encryption engine. The encryptor 608 may utilize the secure master decryption key output from the selector 606 and encrypt the signed secure keys 638 to obtain encrypted and signed keys 632.

The encrypted and signed keys 632 may be copied to intermediate destination registers 610 and may be subsequently utilized by the selector 606 and the encryptor 608 for encryption of subsequent signed secure keys 638. For example, the secure master decryption keys 624 and 626 may be utilized by the selector 606 and the encryptor 608 only once, for the encryption of a first pair of signed secure keys received by the encryptor 608. The resulting encrypted and signed secure keys 628 and 630 may be stored in intermediate destination registers 610 prior to their utilization by the selector 606 and the encryptor 608 for the encryption of a second, subsequent pair of signed secure keys.

As the key generation, signing and encryption system 600 generates encrypted and signed keys 632, the secure key ladder protection increases since the number of generated encrypted and signed keys 632 increases. As the encrypted and signed keys 632 are generated, they may be transmitted from an output location 634.

Figure 6B:
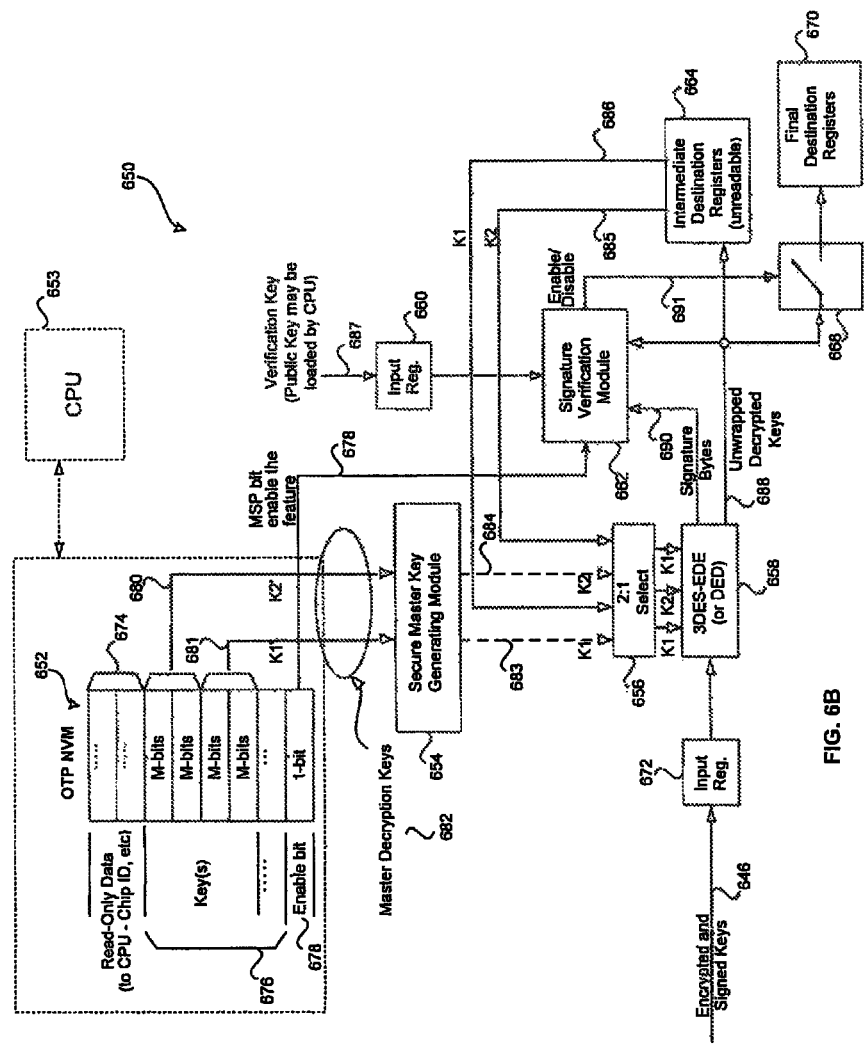
FIG. 6B is a block diagram of an exemplary system for secure key decryption and secure key signature verification, in accordance with an embodiment of the present invention.

Referring now to FIG. 6B, there is illustrated a block diagram of an exemplary system for secure key decryption and secure key signature verification in accordance with an embodiment of the present invention. The exemplary system for secure key decryption and secure key signature verification 650 may comprise a one-time programmable non-volatile memory (OTP NVM) 652, a secure master key generating module 654, a CPU 653, an input register 672, a selector 656, a decryptor 658, an input register 660, a signature verification module 662, an intermediate destination register 664, a switch 668 and final destination registers 670.

The OTP NVM 652 may comprise a random access memory (RAM), such as a DRAM or SRAM, for example. The OTP NVM 652 may be adapted to store, for example, read-only data 674, keys 676, and an enable bit 678. The keys 676 may comprise master decryption keys 681 and 680. The master decryption keys 681 and 680 may each occupy, for example, an even number of bits in the OTP NVM 652. More specifically, the master decryption keys 680 and 681 may each occupy two M-bit cells in the OTP NVM 652. The read-only data 674 of the OTP NVM 652 may comprise chip identification information and other read-only information that may be accessed by the CPU 653. The CFU 653 may be, for example, a microprocessor, a microcontroller or other type of processor.

The master decryption keys 680 and 681 may be sent to the secure master key generating module 654. The secure master key generating module 654 may comprise suitable logic, circuitry and/or code that may be adapted to further enhance the security of the master decryption keys 680 and 681. In accordance with an aspect of the present invention, the secure master key generating module 654 may comprise an encryptor, or a scrambler, that may receive master decryption keys 682 as input. Master decryption keys 682 may comprise master decryption key 680 and master decryption key 681. The secure master key generating module 654 may enhance the security of master decryption key 680 and master decryption key 681 and may generate a secure master decryption key K1 683 and secure master decryption key K2 684.

The selector 656 may comprise suitable logic circuitry, and/or code that may be adapted to select from one or more inputs and generate one or more outputs. In accordance with an aspect of the present invention, the selector 656 may be a 2:1 selector and may generate three outputs from any two received inputs. For example, the secure master decryption keys K1 and K2, 683 and 684 respectively, may be utilized by the selector 656 as inputs to generate an output. For example, the secure master decryption key 683 may be selected twice and the secure master decryption selected once.

The secure key decryption and secure key signature verification system 650 may be adapted to receive encrypted and signed keys 646. The encrypted and signed keys 646 may be generated, for example, by a secure key generation, secure key signing and secure key encryption system, such as the system illustrated on FIG. 6A. Once received by the secure key decryption and secure key verification system 650, the encrypted and signed keys 646 may be stored in an input register 672. The encrypted and signed keys 646 may then be transmitted to the decryptor 658. In accordance with an aspect of the present invention, the encrypted and signed keys 646 may comprise multiples of 64-bits, and may include at least one of an encrypted key, a key destination and/or a key signature.

The decryptor 658 may comprise suitable logic, circuitry and/or code that may be adapted to decrypt any of the encrypted and signed keys 646. In accordance with an aspect of the present invention, the encryptor 658 may comprise a 3DES-Encrypt-Decrypt-Encrypt (EDE) and/or Decrypt-Encrypt-Decrypt (DED) decryption engine. The decryptor 658 may utilize the secure master decryption keys K1 and K2, 683 and 684 respectively, generated as an output of the selector 656. The decryptor 658 generates as output unwrapped decrypted keys 688 and signature bytes 690.

The unwrapped decrypted keys 688 may be communicated to the intermediate destination registers 664, and may subsequently be utilized by the selector 656 and the decryptor 658 for decryption, of subsequent encrypted and signed keys 646. For example, the secure master decryption key K1 683 and the secure master decryption key K2 684 may be utilized by the selector 656 and the decryptor 658 only once, for the decryption of a first pair of encrypted and signed keys 646 that may be received by the decryptor 658. The resulting unwrapped decrypted keys K1 686 and K2 685 may be stored in the intermediate destination registers 664. The unwrapped decrypted keys 685 and 686 may then be utilized by the selector 656 and decryptor 658 for the decryption of a second subsequent pair of encrypted and signed keys 646 that may be received by the decryptor 658. This loop process may continue until all encrypted and signed keys of the received key ladder are unwrapped and decrypted.

After decryption of the encrypted and signed keys 646 by the decryptor 658, the signature bytes 690 of each of the encrypted and signed keys are generated as output from the decryptor 658. The signature bytes 690 may then be entered into the signature verification module 652. The signature verification module 652 may comprise suitable logic, circuitry and/or code but may be adapted to verify the authenticity of the signature bytes 690. In accordance with an aspect of the present invention, the signature verification module 662 may utilize an asymmetric encryption algorithm, such as a public key encryption algorithm, in order to verify the received signature bytes 690. A verification key 687 may be loaded by the CPU 653. A verification key 687 may comprise for example, a public key that may be utilized to verify the signature 690. The verification key 687 may be initially stored in an input register 660. The signature verification module 662 may utilize the verification key (public key) 687 in order to verify the received signature 690. As a result, an enabled/disabled signal 691 may be generated by the signature verification module 662. The enabled/disabled signal 691 may then be communicated to the switch 668.

The switch 668 may receive the unwrapped decrypted key 688 and may allow, or reject, a further transmission of the unlocked decrypted keys 688 through the final destination registers 670. If the command 691 comprises an enable command, the unwrapped decrypted key 688 may be transmitted to the final destination registers 670 for any further processing. If the command 691 comprises a disable command, then the unwrapped decrypted keys 688 may not be transmitted to the final destination registers 670. A disable command 691 may be generated, for example, if the signature verification module 690 ascertains that the signature 690 is not verified. The signature 690 may be unverifiable if, for example, the encrypted and signed keys 646 had been manipulated by an attacker during their transmission to the secure key decryption and secure key verification system 650. Verification of the signature 690 by the signature verification module 662 may be enabled or disabled with the help of the enable bit 678. The bit 678 may comprise a multi-stage programming (MSP) bit. For example, an enable bit 678 may be set to a predetermined value so that the signature verification module 662 is activated and the signature 690 may be verified.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it caries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore it is intended that the present invention not be limited to the particular embodiment disclosed, but that the present invention will include all embodiments falling within the scope of the appended claims.

What is claimed is:

1. A conditional access system for preventing unauthorized receipt of broadcast signals, the system comprising:
a key generating unit configured to generate a plurality of keys;
a key signing unit, coupled to the key generating unit, configured to sign at least two of the plurality of keys to generate first and second signed keys; and
an encryption unit, coupled to the key signing unit, configured to encrypt the first and second signed keys to generate first and second encrypted and signed keys;
wherein the second signed key is encrypted to generate the second encrypted and signed key using the first encrypted and signed key, and the first signed key is encrypted to generate the first encrypted and signed key using a master key; and
a transmitter configured to transmit the first and second encrypted and signed keys, and to broadcast signals scrambled using the second signed key.

2. The system of claim 1, further comprising:
a key table, coupled to the encryption unit, configured to store the master key generated by the key generating unit.

3. The system of claim 1, wherein:
the key signing unit is further configured to generate n signed keys, n being a whole number greater than 2,
the encryption unit is further configured to encrypt each of the n signed keys to generate n encrypted and signed keys, wherein
the n-mth signed key is encrypted to generate the n-mth encrypted and signed key using the n−(m+1)th encrypted and signed key, m being whole numbers ranging from zero to n−2.

4. The system of claim 1, wherein:
the key signing unit is further configured to sign keys using an asymmetric encryption algorithm.

5. The system of claim 1, wherein:
the plurality of keys generated by the key generating unit are private keys.

6. The system of claim 1, further comprising:
a receiver configured to receive the first and second encrypted and signed keys and the broadcast signals scrambled using the second signed key;
a decryption unit configured to decrypt the first and second encrypted and signed keys to recover the first and second signed keys, wherein the second encrypted and signed key is decrypted using the first encrypted and signed key; and
a signature verification unit, coupled to the decryption unit, configured to authenticate each of the first and second signed keys using a verification key, and to generate an enable/disable signal,
wherein the receiver is further configured to descramble the broadcast signals using the second signed key.

7. The system of claim 6, further comprising:
a one-time programmable memory, coupled to the decryption unit, configured to store the master key, wherein the first encrypted and signed key is decrypted using the master key to recover the first signed key.

8. The system of claim 6, wherein:
the verification key is a public key.

9. The system of claim 6, further comprising:
a switch, coupled to the decryption unit and to the signature verification unit, configured to receive the enable/disable signal from the signature verification unit, and to allow or block transmission of one or more decrypted keys based on the enable/disable signal.

10. The system of claim 6, wherein:
the receiver is further configured to receive n encrypted and signed keys, n being a whole number greater than 2, the decryption unit is further configured to decrypt each of the n encrypted and signed keys to recover n signed keys, wherein the n-mth encrypted and signed key is decrypted to recover the n-mth signed key using the n−(m+1)th encrypted and signed key, m being whole numbers ranging from zero to n−2, the first encrypted and signed key is decrypted to recover the first signed key using the master key, and the signature verification unit is further configured to authenticate each of the n signed keys using the verification key.

11. A conditional access apparatus comprising:

a receiver configured to receive first and second encrypted and signed keys and scrambled broadcast signals, wherein the second encrypted and signed key is encrypted by the first encrypted and signed key;

a decryption unit configured to decrypt the first and second encrypted and signed keys to recover first and second signed keys, wherein the second encrypted and signed key is decrypted using the first encrypted and signed key, and the first encrypted and signed key is decrypted using a master key;

a signature verification unit, coupled to the decryption unit, configured to authenticate each of the first and second signed keys using a verification key, and to generate an enable/disable signal; and a descrambler configured to descramble the scrambled broadcast signals using the second signed key.

12. The apparatus of claim 11, further comprising:

a one-time programmable memory, coupled to the decryption unit, configured to store the master key.

13. The apparatus of claim 11, wherein:

the verification key is a public key.

14. The apparatus of claim 11, further comprising:

a switch, coupled to the decryption unit and to the signature verification unit, configured to receive the enable/disable signal from the signature verification unit, and to allow or block transmission of one or more decrypted keys based on the enable/disable signal.

15. The apparatus of claim 11, wherein:

the receiver is further configured to receive n encrypted and signed keys, n being a whole number greater than 2, the decryption unit is further configured to decrypt each of the n encrypted and signed keys to recover n signed keys, wherein the n-mth encrypted and signed key is decrypted to recover the n-mth signed key using the n−(m+1)th encrypted and signed key, m being whole numbers ranging from zero to n−2, and the first encrypted and signed key is decrypted to recover the first signed key using the master key, and the signature verification unit is further configured to authenticate each of the n signed keys using the verification key.

16. A conditional access method comprising:

receiving first and second encrypted and signed keys and scrambled broadcast signals, wherein the second encrypted and signed key is encrypted by the first encrypted and signed key;

decrypting the first and second encrypted and signed keys to recover first and second signed keys, wherein the second encrypted and signed key is decrypted using the first encrypted and signed key, and the first encrypted and signed key is decrypted using a master key;

authenticating each of the first and second signed keys using a verification key;

generating an enable/disable signal based on the authenticating; and descrambling the scrambled broadcast signals using the second signed key.

17. The method of claim 16, wherein:

the verification key is a public key.

18. The method of claim 16, further comprising:

receiving the enable/disable signal; and allowing or blocking transmission of one or more decrypted keys based on the enable/disable signal.

19. The method of claim 16, further comprising:

receiving n encrypted and signed keys, n being a whole number greater than 2;

decrypting each of the n encrypted and signed keys to recover n signed keys, wherein the n-mth encrypted and signed key is decrypted to recover the n-mth signed key using the n−(m+1)th encrypted and signed key, m being whole numbers ranging from zero to n−2;

and authenticating each of the n signed keys using the verification key.

20. The method of claim 16, further comprising:

storing, in a one-time programmable memory coupled to the decryption unit, the master key.

\* \* \* \* \*